(No Model.)
A. E. BROWN.
BORING TOOL.
No. 402,394. Patented Apr. 30, 1889.
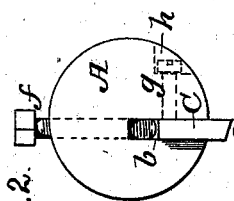
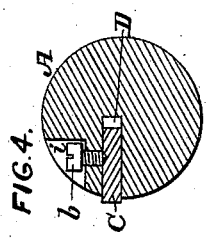
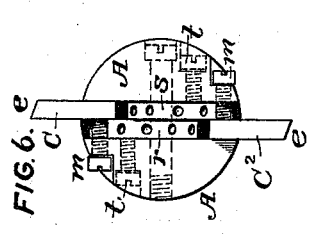
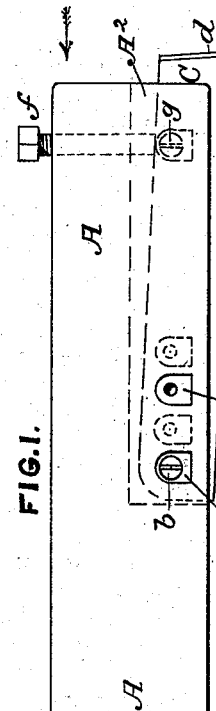
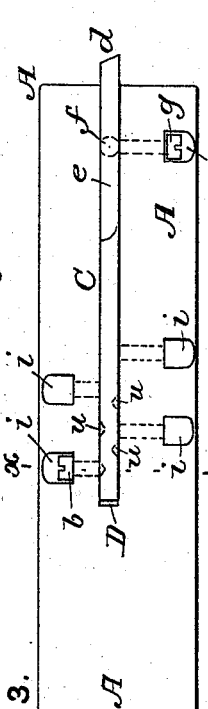
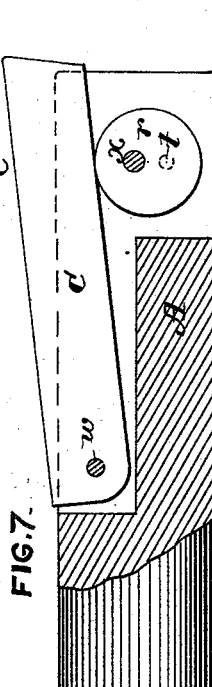
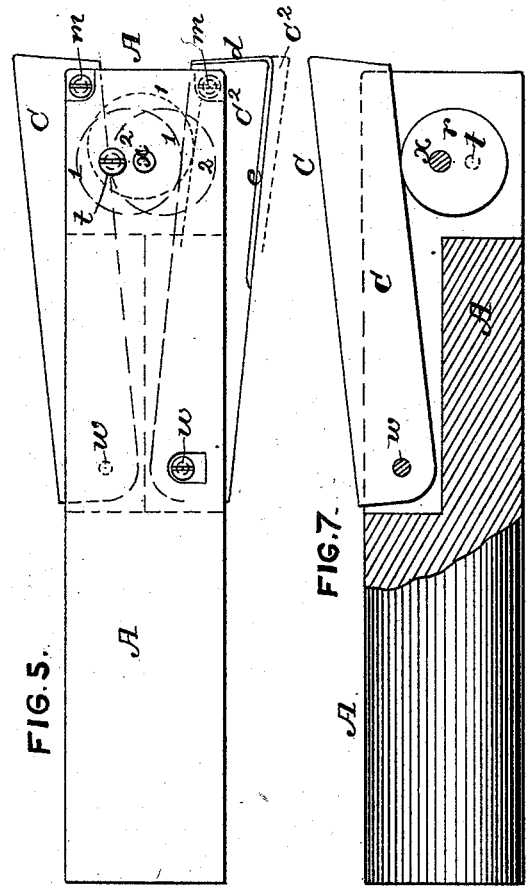
Witnesses
J. Henry Kaiser
Victor J. Evans
Inventor
Alexander E. Brown
By J. N. McIntire
Attorney

UNITED STATES PATENT OFFICE.

ALEXANDER E. BROWN, OF CLEVELAND, OHIO.

BORING-TOOL.

SPECIFICATION forming part of Letters Patent No. 402,394, dated April 30, 1889.

Application filed January 2, 1889. Serial No. 295,229. (No model.)

*To all whom it may concern:*

Be it known that I, ALEXANDER E. BROWN, of Cleveland, in the county of Cuyahoga and State of Ohio, have invented a new and useful Improvement in Boring-Tools; and I do hereby declare that the following is a full, clear, and exact description thereof, reference being had to the accompanying drawings, making part of this application.
Previous to my invention boring bars or tools used to enlarge the bores of previously-made holes have been composed, essentially, of a spindle or tool-stock adapted to enter the hole the bore of which was to be enlarged and a turning tool or cutter arranged to project radially from the bore a short distance within that end of the bore adapted to enter the hole; but in the use of all such boring-tools there are serious practical difficulties or objections, principal among which may be mentioned, first, the inability to bore or finish the bore of the hole clear down to its bottom (when the hole does not penetrate the piece of work) on account of the end of the boring-bar coming in contact with the bottom of the hole or depression before the turning-tool can have reached the same point, and, second, the difficulty of affording to the boring-bar a sufficient degree of stiffness or rigidity to have the boring-tool work perfectly, especially when the hole to be bored or turned out is of such length or depth as to necessitate the use of a long boring-bar and the diameter of said hole is comparatively small, thus rendering it necessary to have the boring-bar of comparatively the same diameter.

I propose to provide for use a novel construction of boring bar or tool which shall not only avoid in practical operation the difficulties or objections common to all tools for the same purpose heretofore made, but which shall in other respects be more desirable and useful; and to these main ends and objects my invention may be said to consist, primarily, in a boring-tool composed of a bar or spindle adapted to be projected into the hole the walls of which are to be finished, and a cutter or cutters formed of suitable material and arranged to project from said end of said bar both laterally and endwise, so that the tool will not only have its cutting edge or edges adapted to cut at a point beyond that to which the projecting end of the bar or tool stock extends into the hole to be turned out, but will also have said cutting edge or edges projected so slightly beyond the bar to which they are secured so as to cut more evenly and perfectly than tools heretofore made, all as will be hereinafter more fully explained, and as will be more specifically pointed out in the claims of this specification; and my invention may be said to further consist in a tool of the type or character just above described involving the specific construction, in which a series of cutters arranged diametrically opposite operate simultaneously upon opposite points of the wall of the hole in the boring operation, so as to centralize and equalize the strain on the boring-bar, thus rendering the boring operation steadier, and in which one or more of the cutting-tools used in combination with the bar are adjustable relatively to the bar, all in a manner and for purposes which will be hereinafter more fully explained, and as will be more specifically pointed out and defined in the claims of this specification.

To enable those skilled in the art to make and use a tool or contrivance embodying my invention, I will now proceed to more fully describe the latter, referring by letters to the accompanying drawings, which form a part of this specification, and in which I have shown my improvements carried out in some of the forms in which I have so far successfully practiced my invention, though the latter may of course be carried into effect under other modifications of the structure shown.

In the drawings, Figure 1 is a side view of a boring-tool embracing the main features of my invention. Fig. 2 is an end view of the same. Fig. 3 is another side view or elevation looking at the tool turned axially into another position. Fig. 4 is an end view looking at the tool in the same position as that in which it is shown at Fig. 3. Fig. 5 is a side view showing a tool embracing both the generic and the specific features of the construction made the subject of my application. Fig. 6 is an end view of the tool shown in side view at Fig. 5; and Fig. 7 is a longitudinal sectional elevation illustrating more particularly certain of the devices and their operations, as will be presently more fully explained.

In the several figures the same parts will found designated by the same letters of reference.

Referring now particularly to Figs. 1 to 4, inclusive, A represents a cylindrical bar or tool stock adapted either to be held stationary at one end in the tail-block of a blade or boring-engine and to operate upon the piece of work while the latter is rotated on an axis coincident with the axis of said tool-stock, or to be secured in the rotatory head of a form of boring-machine in which the piece of work may be rotated. Said tool-stock or boring-bar A is formed, as shown, with a longitudinal slot or cut-out, $A^2$, arranged almost radially and made of sufficient length, within which is placed the plate-like piece of metal, C, which constitutes the cutter or boring-tool of the implement. This cutter C is composed, preferably, of "Mushet" or self-hardening steel, and is formed, as shown, with beveled cutting-edges $d$ and $e$, respectively, at its protruding end and portion of its protruding side, the cutting-edge thus formed at its protruding end lying in a line slightly oblique to the plane in which lies the end of the cylindrical bar or stock A. Said cutter C fits snugly but movably within the socket or longitudinal housing $A^2$ of the bar, and is held in place pivotally at its root or innermost end by means of a set-screw, $b$, the pointed end of which fits in the slight depression in one side of said cutter, all as clearly shown at Figs. 1, 3, and 4, while by means of a set-screw, $g$, which is tapped into the stock A near its outer end, as clearly shown, said cutter C is securely held widthwise in its seat near its outer or projecting and cutting portion.

$f$ is a set-screw which is tapped into the stock A near its outer end and in a direction transversely to that in which lies the set-screw $g$, the said set-screw $f$ serving as an abutment or support to the forward or outer portion of the cutter C during the strain to which said cutter is subjected while in operation.

Of course the head of the set-screw $f$ should not project quite as far beyond the axial line of the tool-stock A as does the extreme forward or outer corner or portion of the cutter C, as otherwise said screw-head would not pass freely into the bore turned or cut by said cutter, and preferably, for the purpose of clearance, the heads of both the pivotal screw $b$ and the clamping-screw $g$ are laid into depressions or countersinks in the stock A, (marked, respectively, $i$ and $h$.)

As will be seen by reference particularly to Figs. 1 and 3, there is a series (four in the case shown) of the depressions, $i$, located oppositely and in intermediate planes in cross-section of the bar A, while the inner portion of the cutter C has a series of slight depressions, $u$, (see Fig. 3,) arranged at opposite sides of said cutter and located intermediately, all as clearly shown, so that when said cutter shall have become sufficiently worn away at its outer and operative end by successive grinding or sharpening it may be set out endwise and held pivotally in its various positions by moving the set-screw $b$ into first one and then another of the holes shown as adapted to receive said screw.

It will be understood that in the operation of a contrivance such as shown and so far described the single cutter C will operate at one side of the wall of the hole to be bored or turned out, but in operating thereat will cut at its beveled end portion, $d$, to any proper extent, according to the size of the initial hole as compared with the point to which the outer end of the cutting-lip $d$ may be adjusted or set by the abutment-screw $f$, as hereinbefore explained, and that in performing the turning or boring operation the cutting edge or edges of the device C is or are securely held within the housing $A^2$ of the bar A in such close proximity to the bar as that the cutter will have practically no chance to spring or vibrate, and that therefore the work will be done perfectly, while at the same time, by reason of the capacity of the cutter C to be periodically moved endwise as its cutting-edge may be ground away by sharpening, a comparatively long cutter, and hence one that will last a great while, may be employed. By reason, however, of the cutter C being made as shown and described and adapted to be adjusted as set forth, said cutter, when composed of the proper material—such, for instance, as Mushet or self-hardening steel—will last for an almost indefinite time, and by reason of all the conditions just explained as to the character of the material of which such cutters are preferably made and the manner in which the cutter C is formed and adjusted such cutter, though exceedingly cheap, will do the work to perfection and last for a great while.

In the use of cutters such as heretofore employed and combined with a boring-bar in the usual manner it has been impracticable to use material such as the cutter C is composed of, which can only be sharpened by a grinding operation and is almost indestructible, because of the fact that such heretofore employed cutters have had to be shaped or manufactured by forging, filing, &c., into the form peculiar and necessary to such cutting-tools. By reason of the specific construction shown, in which the cutter C is clamped laterally in its housing by the set-screw $g$ and is backed up and may be adjusted radially of the bar A by the set-screw $f$, I am enabled in the use of my improved contrivance to adjust easily and to an exact caliber the extreme outer portion of the cutting edge or lip $d$, so as to predetermine with more convenience and a greater degree of nicety than has heretofore been possible the exact diameter or bore of the hole to be finished out by the boring-tool.

In the form of contrivance shown at Figs. 5 and 6 the tool-stock A is slotted out radially at its outer or projecting end, and within said slot are arranged duplicate cutters C and $C^2$, which are substantially like the cutter C shown in the preceding figures, the said two cutters being pivotally secured at the points $w$ and being clamped laterally or held in place near their outer ends by set-screws $m$, which are tapped into the outer or end portions of the tool-stock A and clamp said cutters in place, all as clearly shown.

$r$ and $s$ (see particularly Fig. 6) are two adjusting and abutment eccentrics, which are mounted within the slot of the tool-stock A, and mounted on a common axis of motion in such manner that the face or periphery of $r$ will operate as an abutment to the inner edge of the cutter $C^2$, while that of the one marked $s$ will serve a similar capacity in connection with the cutter C, and each of said eccentrics is adapted to be clamped laterally or secured in place in its axis of motion by means of a set-screw, $t$, all in such manner that by the turning in one direction or the other of said eccentrics and then clamping them securely they may be made to both adjust outwardly and to serve as permanent abutments to the outer ends or working portions of the cutters C and $C^2$. Preferably, for convenience in turning the eccentrics, they have each a series of small holes or depressions in the periphery, into which the end of a small bar or key may be conveniently inserted to effect their axial movement. In this form of my improved contrivance the two cutters C and $C^2$ operate simultaneously upon diametrical sides or portions of the wall of the hole to be bored or turned out and to produce a final hole or bore of any desired and exact diameter which the contrivance is capable of producing by a proper adjustment of its cutters C and $C^2$.

By special observation of Fig. 5 it will be seen that I have illustrated the circumferences of the two eccentrics $r$ and $s$, respectively, by two broken-lined circles, (marked 1 and 2,) while by the dotted circle (marked also 1) and partially dotted outline of the cutter $C^2$, I have illustrated how by turning that one of the eccentrics the circle of which is marked 1 on its axis of motion the cutter marked $C^2$ will be forced radially outward to its working end, and it is by this means of adjustment of the two cutters to the same extent that I am enabled, with great convenience and perfect exactitude, to set the extreme outer points of the cutting-tools by caliber to bore a hole of precisely the required diameter. In this form of tool, the cutters operating at diametrically-opposite points, the strain on the two is substantially equalized and centralized, and still greater nicety of result can be attained in the event of any possibility of the slightest spring in the entire contrivance in boring out holes of considerable length or depth.

At Fig. 7 I have shown the same form of contrivance as that illustrated at Figs. 1 to 4, inclusive, except that the single cutter shown, which is pivotally connected at $w$ to the tool-stock A, and which is supposed to be clamped in place by a set-screw, the same as at Fig. 1, has combined with it an eccentric, $r$, mounted on the axis $x$ for the purpose of nicely adjusting the cutter C and serving as an abutment against any forward movements of its outer and cutting portion, the said eccentric being provided with a clamping set-screw at the point $t$.

It will be understood, of course, that where two or more cutters arranged in diametrically-opposite positions are used, as seen at Figs. 5 and 6, the cutting ends or lip portions $d$ of such cutters may be used practically for the purpose of boring out a hole of considerable diameter after a comparatively small hole may have been drilled through the material or work equal in diameter to the distance apart of the extreme inner ends of said cutting-edges $d$, and also that, if deemed expedient, the inclination or obliquity of the cutting-edges $d$ relatively to the plane of the end of the tool-stock A may be reversed from that shown in the drawings.

So far as the primary part of my invention or the generic feature of improvement is concerned some other construction than that made the subject of the specific or secondary part of my invention might be employed; or, in other words, the main feature of my invention may be used with great benefit or advantage without coupling therewith the subordinate features of invention hereinbefore shown and described.

Having now so fully explained the several parts of my invention that those skilled in the art can make and use a boring contrivance involving, either in part or in whole, the improvements herein set forth, what I claim as new, and desire to secure by Letters Patent, is—

1. In a boring-tool, the combination, with the tool-holder or bar A, of a plate-like cutter, C, pivotally connected near its inner end to said tool-holder, means for adjusting or setting out the outer end of said cutter laterally of the tool-holder, and means for clamping or securely holding in adjustment said cutter, the whole constructed and operating substantially as specified, for the purposes set forth.

2. In combination with a suitable tool-holder or spindle-bar, A, a series of plate-like cutters arranged partially within suitable housings in said holder and having their cutting-edges in planes which pass radially through the said holder, suitable means for adjusting the cutting edges or portions of said plate-like cutters radially of the tool-holder and equidistant, respectively, from the axis of said holder, and means for clamping or holding in place said cutters when properly adjusted, all in substantially the manner hereinbefore set forth.

3. In combination with the tool-holder A and a plate-like cutter, C, arranged partially within a housing in said holder, a movable or adjustable pivotal connection between said cutter and holder, and means for holding fast the outer or operative end of the adjustable cutter, all substantially as and for the purposes set forth.

4. In a boring-tool of the type shown and described, the combination, with the slotted-out tool-holder A and a series of plate-like cutters, C, pivotally connected therewith, as specified, of a series of adjusting cam-like disks and a series of clamping-screws for holding fast said cam-like disks and said cutters, all substantially as hereinbefore set forth.

5. In a boring-tool of the type shown and described, the combination, with the tool-holder A and a cutter, C, arranged partially within a housing of said holder and laterally adjustable therein, of a series of screw-holes in the holder, a series of indentations in the cutter-plate C, and a removable set-screw adapted to effect the pivotal engagement of the cutter and holder at different points as the cutter becomes worn and has to be set farther out endwise, all substantially as hereinbefore set forth.

In witness whereof I have hereunto set my hand this 14th day of December, 1888.

ALEXANDER E. BROWN.

In presence of—
GEORGE C. WING,
J. P. SMITH.